Patented Mar. 19, 1929.

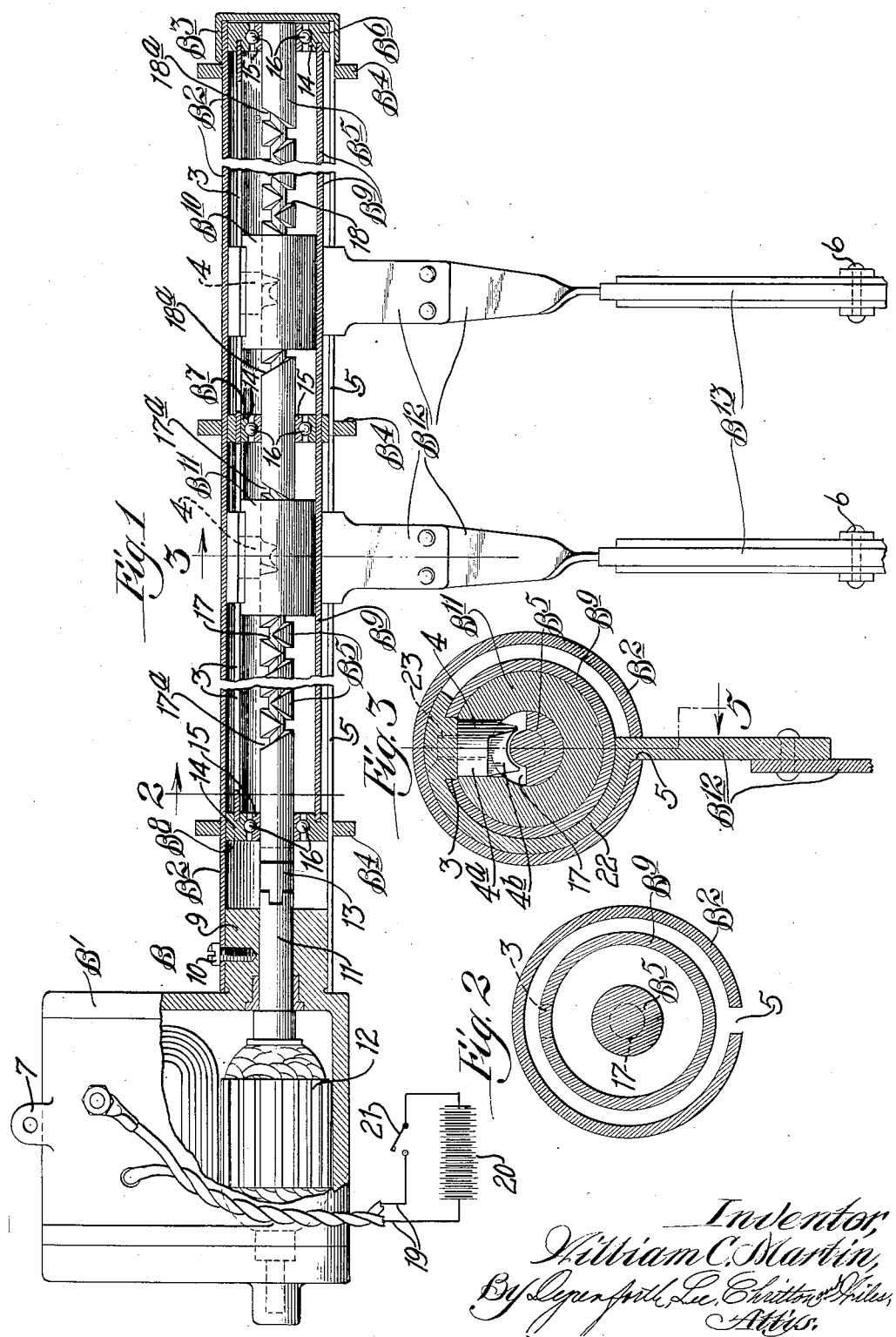

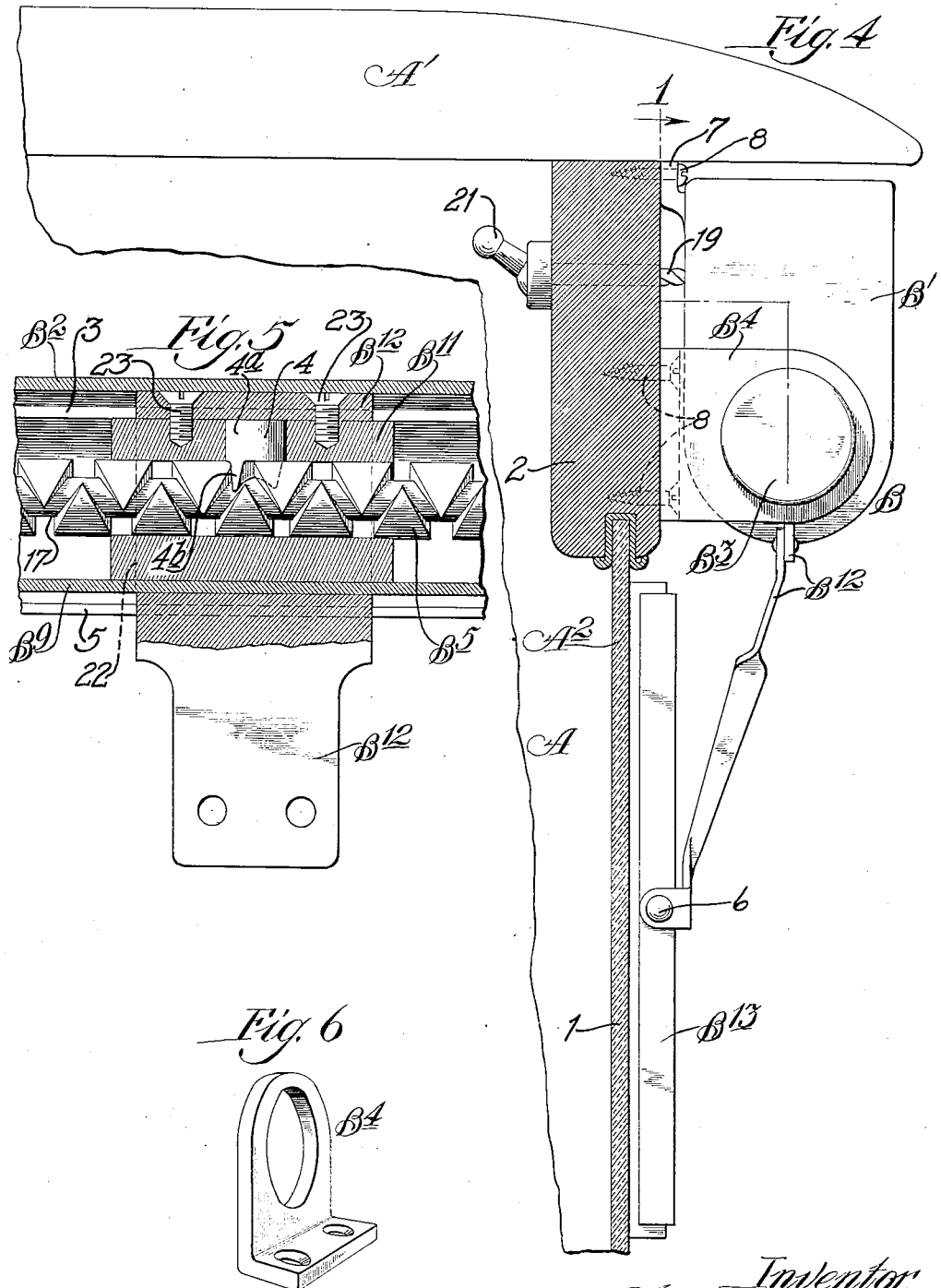

1,706,125

UNITED STATES PATENT OFFICE.

WILLIAM C. MARTIN, OF MILWAUKEE, WISCONSIN, ASSIGNOR OF ONE-FOURTH TO JOHN H. LEE, OF OAK PARK, ILLINOIS.

WINDSHIELD CLEANER.

Application filed August 25, 1927. Serial No. 215,352.

This invention relates particularly to windshield cleaners of the type employing a slidably mounted wiper adapted to travel back and forth across the windshield so as to give clear vision throughout the length of the windshield.

The primary object of the invention is to provide an improved device of this character which can be manufactured at moderate cost. The improved device may be operated by means of an electric motor, or it may be otherwise driven.

In accordance with the present invention, a pair of wipers are employed which travel back and forth between an intermediate point and the ends of the windshield; and these wipers preferably are actuated in opposite directions, thereby balancing the thrusts which are exerted on the screw-shaft employed.

The invention is illustrated in a preferred embodiment in the accompanying drawings, in which—

Fig. 1 is a view, mainly in section, taken approximately as indicated at line 1 of Fig. 4; Fig. 2, a transverse section taken as indicated at line 2 of Fig. 1; Fig. 3, a broken transverse section taken as indicated at line 3 of Fig. 1; Fig. 4, a broken sectional view of an automobile body, the improved device being applied to the windshield thereof; Fig. 5, a broken sectional view taken as indicated at line 5 of Fig. 3; and Fig. 6, a perspective view of a bracket-ring employed.

In the illustration given, A designates an automobile body having a top $A'$ and a windshield $A^2$; and B designates the improved windshield cleaner.

The automobile body A may be of any desired construction, as is true, also, of the windshield. In the illustration, the windshield $A^2$ comprises a glass 1 having its upper margin secured in a cross-bar 2 located beneath the top $A'$.

The device B comprises, in the form illustrated, a motor-casing $B'$; an elongated tubular housing $B^2$ connected at one end with the motor-casing and equipped at the other end with a removable cap $B^3$; bracket-rings $B^4$ which serve as a means for attaching the elongated housing to the windshield-frame; a screw-shaft $B^5$ journalled in bearings $B^6$, $B^7$ and $B^8$ with which the elongated housing is fitted internally; an internal guide-tube $B^9$ rigidly connected with the stationary members of the bearings mentioned, said guide-tube $B^9$ being provided at its upper portion with a longitudinal slot 3; slides, or nuts, $B^{10}$ and $B^{11}$ slidable within the tube $B^9$ and having perforations through which the screw-shaft extends freely, said slides being equipped with reversible thread-engaging members 4; arms $B^{12}$, $B^{12}$, attached at their upper ends to the nuts, or slides, said arms working in a slot 5 with which the housing $B^2$ is provided at its lower side; and wiper-elements $B^{13}$ connected with the arms $B^{12}$ as by means of pivots 6.

The motor-casing $B'$ is equipped with lugs 7 through the medium of which the casing is attached to the bar 2 as by means of screws 8.

The motor-casing is equipped at one side with a lug 9 which serves as a plug for the adjacent end of the tubular housing $B^2$, which is secured to the lug by means of a screw 10. The lug, or boss, 9 is provided with a perforation through which extends the armature shaft 11 with which the armature 12 is provided.

The screw-shaft $B^5$ is in alinement with the armature shaft and direct-connected thereto by a coupling 13. The bearings for the screw-shaft preferably are anti-friction bearings. These comprise outer rings 14 which are fitted rigidly within the housing $B^2$, inner rings 15 which are fitted rigidly on the screw-shaft, and balls 16 interposed between the inner and outer rings.

The bearing $B^7$ is at an intermediate point and separates the housing $B^2$ into two portions of about equal length. The screw-shaft is provided with two sets of right and left thread-grooves 17 and 18. Each set of thread-grooves terminates at both ends in reversing grooves $17^a$ and $18^a$.

The thread-engaging member 4, in each case, has a portion $4^a$ swiveled in the upper portion of the nut, and a blade $4^b$ which engages the thread-groove.

The electric motor is shown provided with a circuit 19 supplied with a battery 20 and equipped with a switch 21 (conventionally shown in Fig. 1). In practice, the switch 21 may be mounted on the cross-bar 2 within easy reach of the driver, as illustrated in Fig. 4.

It will be noted by reference to Fig. 3 that the wiper-arm is provided with a semi-cylindrical portion 22 which is disposed between the tubular housing B² and the inner guide-tube B⁹; and the upper portion of this segment is secured, by means of screws 23, to the upper portion of the nut, or slide, in the manner shown in Fig. 5.

Also, it will be understood from Fig. 3 that the nut, or slide, has a smooth cylindrical exterior surface which fits snugly and slidably within the guide-tube B⁹. It will be observed that the wiper-arms B¹² are suitably guided at the guide-slots 3 and 5, as appears from Fig. 3.

From the description given, it will be understood that in the operation of the device the screw-shaft rotates constantly in one direction. This causes the slides, or nuts, B¹⁰ and B¹¹ to travel back and forth, and thus reciprocate the wipers back and forth longitudinally of the windshield. Each wiper operates to clear the glass throughout a part of its length, so that substantially a full length clear vision is obtained.

The use of the internal guide-tube B⁹ is advantageous in preventing vibration and chattering of the screw-shaft, it being noted that the nuts B are of substantially the same diameter as the internal diameter of the guide-tube. Moreover, the guide-tube, in addition to preventing chattering, tends to more fully muffle the sound, so that a very smooth and practically noiseless operation is obtained.

Preferably the nuts B¹⁰ and B¹¹ are so connected with the screw-shaft that they will move in opposite directions. Thus, the nuts carry the wipers away from the central bearing B⁷ in one movement of reciprocation and towards said bearing in the next movement of reciprocation. This results in a balanced thrust upon the screw-shaft which is advantageous, but which is not indispensable. If desired, the nuts may be so connected with the screw-shaft that they will move simultaneously in the same direction.

While, in the illustration given, an electric motor is shown for the purpose of actuating the screw-shaft, it is to be understood that other means for actuating the screw-shaft may be employed.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A windshield wiper comprising an elongated housing provided with a slot at the bottom, a screw-shaft journalled in said housing and provided on opposite sides of an intermediate point with sets of intersecting right and left thread-grooves, each set having reversing grooves at its ends, slides in said housing equipped with reversible groove-engaging devices at the top, and a wiper attached to each slide and provided with an arm working through said slot.

2. A windshield wiper comprising an elongated housing provided with a slot at the bottom, a screw-shaft journalled in said housing and provided on opposite sides of an intermediate point with sets of intersecting right and left thread-grooves, each set having reversing grooves at its ends, slides in said housing equipped with reversible groove-engaging devices, an internal guide-tube within said housing and within which said slides are mounted, said tube being provided with a slot at the top, and a wiper-arm attached to each slide and reciprocable in said slots.

3. A windshield wiper comprising an elongated housing provided with a slot and equipped with means for attachment to the front of an automobile body, a series of anti-friction bearings having outer race-members secured within said housing, a guide-tube mounted in said outer race-members and provided with slots, a screw-shaft journalled in said anti-friction bearings and provided with two sets of right and left intersecting thread-grooves, each set of grooves having reversing grooves at its ends, slides in said guide-tube equipped with wiper-arms working through said slots and equipped also with reversible groove-engaging devices, and a wiper attached to each of said arms.

4. A windshield wiper comprising an elongated housing provided at its lower side with a slot, means for attaching said housing to the front of an automobile body, a guide-tube and supporting means therefor mounted within said housing, said guide-tube being provided at its upper portion with a longitudinal slot, a screw-shaft journalled in said supporting means and provided with two sets of intersecting right and left thread-grooves, each set being provided at its ends with reversing grooves, slides mounted in said guide-tube and equipped with reversible thread-engaging devices, a wiper-arm corresponding with each slide and having a semi-cylindrical segment housed between the guide-tube and housing and having the upper portion thereof connected with the corresponding slide, and a wiper connected with each wiper-arm.

5. A windshield wiper comprising an elongated housing provided internally with an intermediate anti-friction bearing and near its ends with anti-friction bearings, a guide-tube fixedly mounted in the outer fixed members of the anti-friction bearings, a screw-shaft on which the inner members of the anti-friction bearings are secured, said screw-shaft being provided on opposite sides of said intermediate bearing with sets of intersecting right and left thread-grooves, each set having reversing grooves at its ends, slides mounted in said guide-tube on opposite sides of the intermediate bearing and equipped with reversible thread-engaging devices, wiper-arms attached to said slides, and wipers carried by said wiper-arms.

6. A windshield wiper comprising an elongated housing provided with a slot, a motor-casing connected with one end of said housing and provided with an armature having a shaft extending into said housing, means for attaching said housing to the front of an automobile body, a screw-shaft journalled in said housing and provided with two sets of right and left intersecting thread-grooves, each set having reversing grooves at its ends, slides equipped with reversible thread-engaging devices engaging the sets of thread-grooves, respectively, a wiper-arm attached to each slide and working through said slot, and a wiper carried by each wiper-arm.

7. A windshield wiper comprising an elongated housing provided with a slot, a screw-shaft journalled in said housing and provided on opposite sides of an intermediate point with sets of intersecting right and left thread-grooves, each set having reversing grooves at its ends, slides equipped with reversible thread-engaging devices so engaged with said thread-grooves as to cause the slides to move simultaneously in opposite directions, wiper-arms connected with said slides, wipers carried by said arms, and means for actuating said screw-shaft continuously in a given direction.

WILLIAM C. MARTIN.